United States Patent
Tachiwa

(10) Patent No.: US 9,278,447 B2
(45) Date of Patent: Mar. 8, 2016

(54) CONTROL APPARATUS, CONTROL METHOD AND STORAGE MEDIUM

(71) Applicant: CANON KABUSHIKI KAISHA, Tokyo (JP)

(72) Inventor: Wataru Tachiwa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 173 days.

(21) Appl. No.: 13/852,760

(22) Filed: Mar. 28, 2013

(65) Prior Publication Data

US 2013/0297069 A1    Nov. 7, 2013

(30) Foreign Application Priority Data

May 1, 2012    (JP) ................................ 2012-104887

(51) Int. Cl.
| | |
|---|---|
| B25J 9/16 | (2006.01) |
| G05B 19/418 | (2006.01) |
| G05B 19/05 | (2006.01) |
| B25J 13/00 | (2006.01) |
| H04B 7/02 | (2006.01) |

(52) U.S. Cl.
CPC *B25J 9/16* (2013.01); *B25J 13/006* (2013.01); *G05B 19/052* (2013.01); *G05B 19/4185* (2013.01); *G05B 2219/23113* (2013.01); *G05B 2219/25131* (2013.01); *G05B 2219/25154* (2013.01); *G05B 2219/31251* (2013.01); *H04B 7/022* (2013.01)

(58) Field of Classification Search
CPC ........... G05B 2219/15027; G05B 2219/21039; G05B 2219/23113; G05B 2219/25131; G05B 2219/25154; G05B 2219/25162; G05B 2219/33203; G05B 2219/23192; G05B 2219/33109; G05B 2219/35386; G05B 19/4185; G05B 19/052; G05B 2219/15072; G05B 2219/15078; G05B 2219/31251; B25J 9/16; B25J 13/006; H04B 7/022
USPC ................ 700/247, 249; 901/2, 6; 318/568.2, 318/568.24

See application file for complete search history.

(56) References Cited

U.S. PATENT DOCUMENTS

| | | | |
|---|---|---|---|
| 7,933,667 B2* | 4/2011 | Sjoberg et al. .................. 700/82 |
| 8,144,718 B2* | 3/2012 | Schwenkel et al. ........... 370/408 |
| 2005/0114577 A1* | 5/2005 | Beckhoff et al. ............. 710/110 |
| 2006/0209868 A1* | 9/2006 | Callaghan ..................... 370/428 |
| 2007/0063834 A1* | 3/2007 | Bozzone et al. ........... 340/539.1 |
| 2007/0276538 A1* | 11/2007 | Kjellsson et al. ............. 700/245 |
| 2007/0297890 A1* | 12/2007 | Sjoberg et al. ................ 414/735 |
| 2008/0002737 A1* | 1/2008 | Schwenkel et al. ........... 370/463 |
| 2008/0263628 A1* | 10/2008 | Norman et al. .................... 726/1 |
| 2013/0090762 A1 | 4/2013 | Asai et al. ..................... 700/248 |
| 2015/0197010 A1* | 7/2015 | Ruuspakka et al. .......... 700/245 |

FOREIGN PATENT DOCUMENTS

| | | |
|---|---|---|
| JP | 2000-307507 | 11/2000 |
| JP | 2010-135982 | 6/2010 |

* cited by examiner

*Primary Examiner* — Jason Holloway
(74) *Attorney, Agent, or Firm* — Fitzpatrick, Cella, Harper & Scinto

(57) ABSTRACT

A control apparatus detects a control signal that controls a movable portion of a device, and selects, from a plurality of transmitter stations, a transmitter station that transmits data a plurality of times to a movable station moving in accordance with movement of the movable portion, based on the detected control signal.

11 Claims, 12 Drawing Sheets

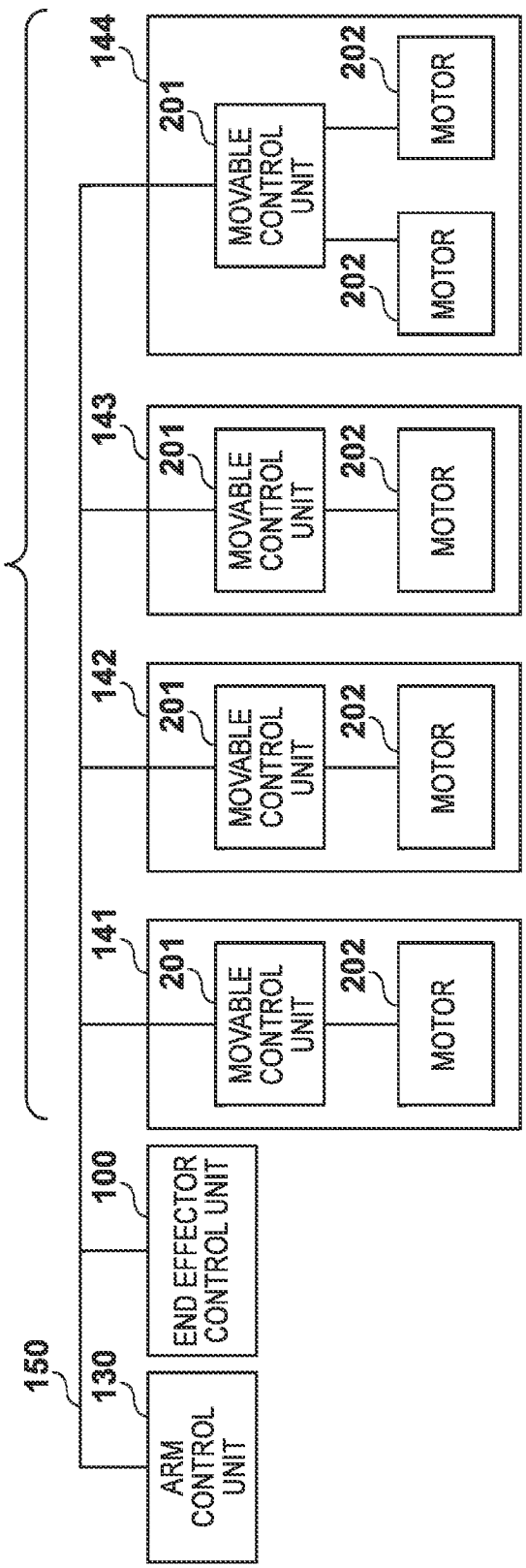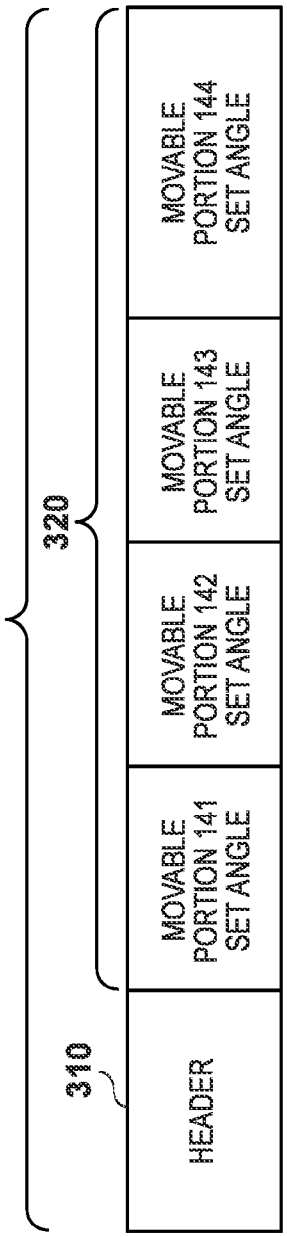

FIG. 6

| Movable Portion 141 Set Angle | Movable Portion 142 Set Angle | Movable Portion 143 Set Angle | Movable Portion 144 Set Angle | Fixed Station 101 Communication Quality | Fixed Station 102 Communication Quality | Fixed Station 103 Communication Quality | Fixed Station 104 Communication Quality |
|---|---|---|---|---|---|---|---|
| 70 | 160 | 30 | 150, 20 | 1 | 1 | 1 | 1 |
| 72 | 159 | 31 | 150, 19 | 1 | 1 | 1 | 1 |
| : | : | : | : | : | : | : | : |
| 108 | 140 | 40 | 148, 10 | 1 | 1 | 1 | 0 |
| : | : | : | : | : | : | : | : |
| 108 | 140 | 150 | 210, 10 | 0 | 0 | 1 | 1 |
| : | : | : | : | : | : | : | : |

F I G. 7C
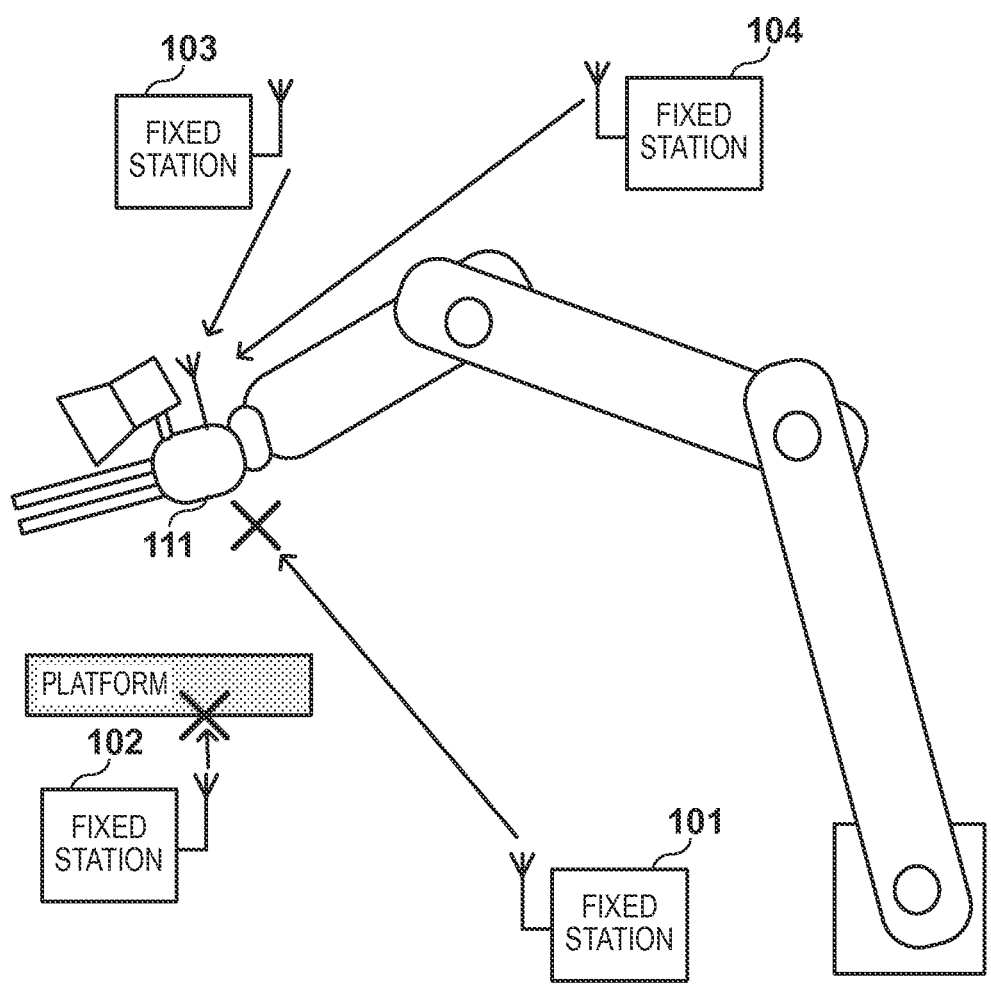

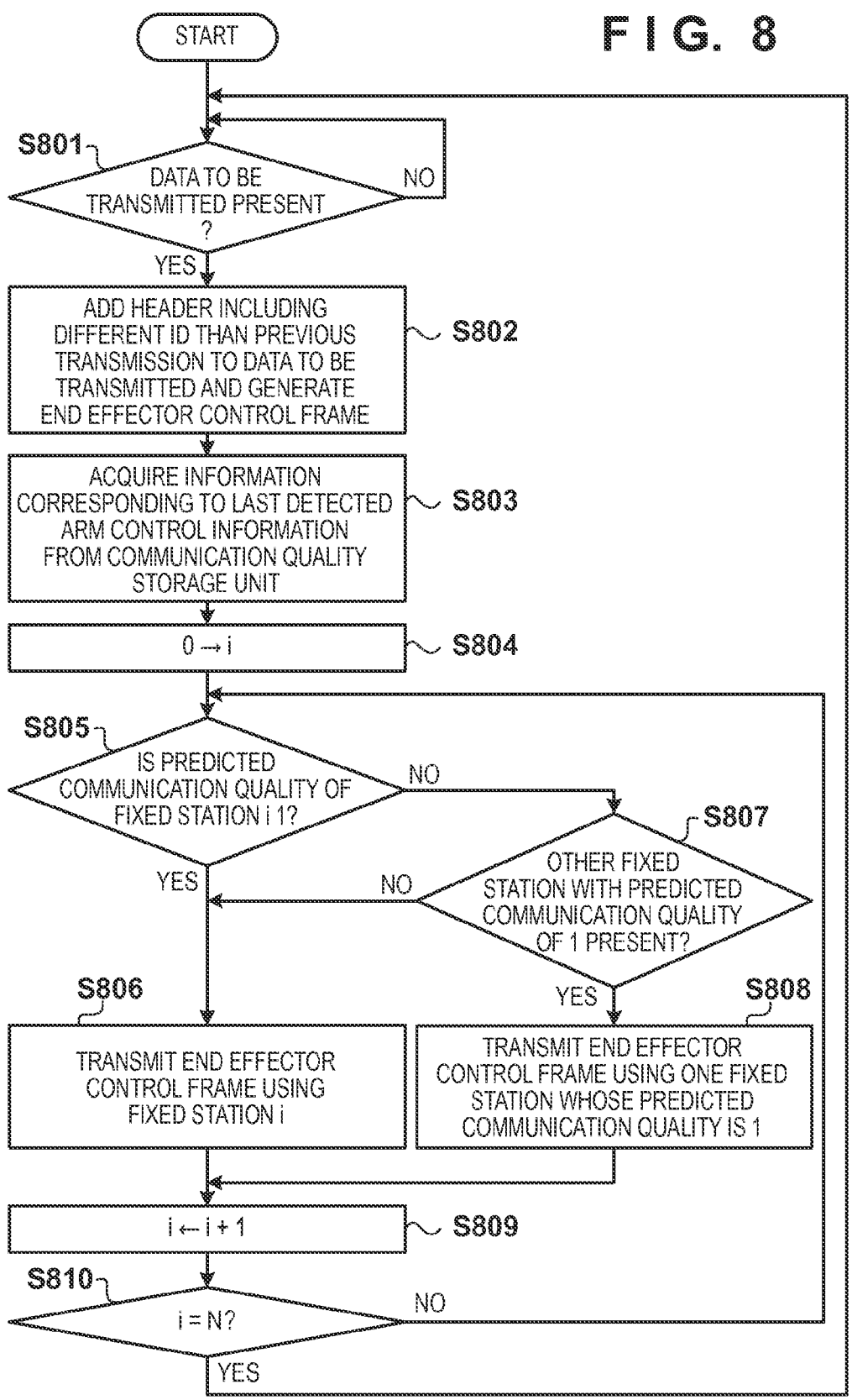

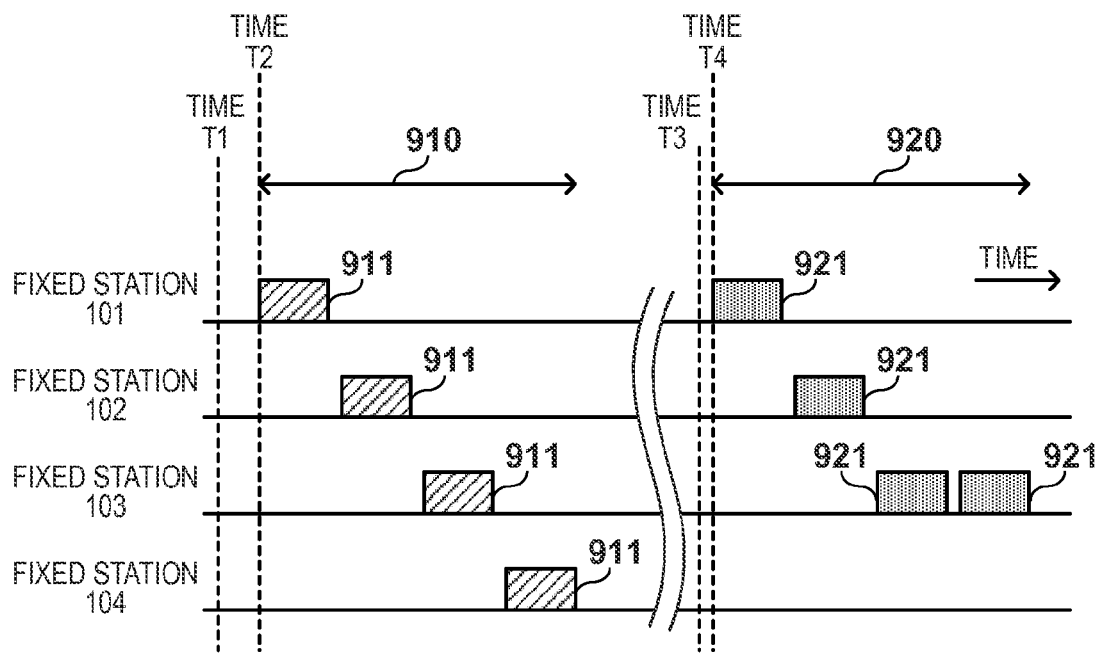

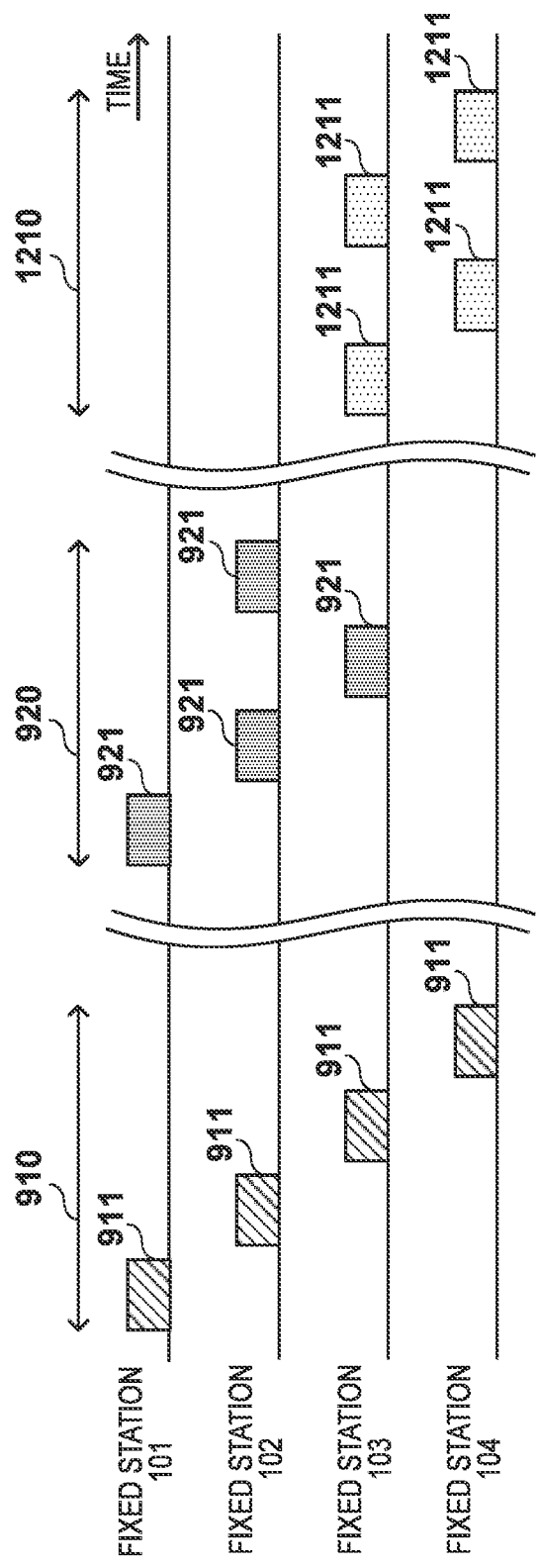

CONTROL APPARATUS, CONTROL METHOD AND STORAGE MEDIUM

BACKGROUND OF THE INVENTION

1. Field of the Invention

The present invention relates to techniques for controlling communication between a movable station that is provided in a device and that moves and a fixed station.

2. Description of the Related Art

In the field of industrial devices, the development of cell-production robots, in which a single robot is capable of performing multiple types of operations, has been advancing. Such robots are comprised of an arm that is used for all tasks and an end effector that corresponds to an area from the wrist down. Multiple types of end effectors are prepared based on the type of each task, and the robot automatically exchanges end effectors depending on the type of the task, such as welding, gripping, tightening screws, and so on. There are some end effectors capable of executing advanced processes, such as capturing a processing target using a mounted camera, performing image processing on the captured image, and selecting and gripping a single component from among mixed components using the result of the image processing. In the case where control is carried out based on image processing, the processor that performs that processing is required to have high processing capabilities, and such processors can be large, and can also act as heat sources. For example, in precision machining applications, the expansion and contraction of processing targets, end effector components, and so on due to heat can quickly become problematic; thus such processors are often disposed in locations distanced from the robot, and remotely control the robot using a communication cable.

Meanwhile, in addition to being detachable as mentioned earlier, it is generally required that end effectors are capable of changing angle, orientation, and so on relative to the arm. Accordingly, it is necessary for a communication cable used to acquire images from and control an end effector to have a special mechanism for accommodating detachment, deformation, and so on. Such mechanisms have high costs, and also carry a risk of degradation and disconnection due to the cable repeatedly deforming; there is consequently an increased need to control end effectors through wireless communication.

However, wireless communication techniques widely used in the field of mobile information terminals, such as wireless LAN (local area network) and the like, are generally difficult to employ in the aforementioned applications. This is because industrial devices are required to transmit uncompressed images, transmit control data with extremely low latency, and so on. Wireless LAN and the like were not designed with such applications in mind, and thus do not meet the demands of industrial devices.

Meanwhile, high-frequency wireless communication systems such as 60 GHz-band millimeter waves can be used for wireless communication systems for the aforementioned applications. Such wireless communication systems are capable of ensuring bandwidths of 1 Gbps or more, and are thus capable of transmitting uncompressed images. Furthermore, by using appropriate communication protocols, such systems are also capable of transmitting control data at low latency. However, even in the case where it is necessary to transmit uncompressed image data but it is not necessary to transmit control data at low latency, there are cases, due to issues such as device size and heat, where it is difficult to use separate communication systems, such as using millimeter wave communication to transmit image data and wireless LAN to transmit control data.

It is typically more difficult to ensure reliability in wireless communication than in wired communication. One reason for this is that wireless communication is susceptible to shielding of and reflections from obstacles, noise from surrounding sources, and so on. End effectors not only constantly change position, orientation, and so on as the arm moves, but also operate in environments where other apparatuses are moving in the periphery, and thus ensuring reliability when employing wireless communication to control robots is an issue.

A system that uses a plurality of fixed stations is known as a technique for improving the reliability of wireless communication. For example, Japanese Patent Laid-Open No. 2010-135982 discloses a technique that improves the reliability of communication by switching among a plurality of fixed stations in time-division and communicating with a movable station to obtain a spatial diversity effect. Japanese Patent Laid-Open No. 2000-307507, meanwhile, discloses a technique that improves the reliability of communication by acquiring location information detected by a movable station and using the fixed station that is closest to that location.

If an end effector is thought of as a movable station and a remote control apparatus is thought of as a fixed station, a system that controls a cell-production robot by providing a plurality of fixed stations in the vicinity of an arm and communicating wirelessly with a movable station installed in the end effector at the end of the arm can be considered. Because communications with high capacity and low-latency are carried out, it is assumed here that millimeter wave wireless communication is used. High-frequency electromagnetic waves such as millimeter waves, submillimeter waves, and so on have a high degree of straightness, and have a property in which communication is difficult, even at short distances, in a non line-of-sight environment. Typically, a large number of components, platforms on which the components are placed, and so on are present in environments in which cell-production robots operate, and thus transmission paths between each fixed station and the movable station frequently fall into the non line-of-sight condition.

Meanwhile, even if the line-of-sight can be ensured, there are cases where communication fails due to reflections from nearby objects, noise, and so on. In order to prevent such communication failures, performing redundant communication by using a plurality of fixed stations that can ensure lines of sight can be considered. However, with conventional techniques, it has not been possible to automatically perform such communication control in accordance with arm operations. As a result, there has been a problem in that in some cases, the communication reliability necessary for robot control cannot be ensured, and it is thus necessary to carry out hard-wired control, incurring high costs as a result.

Having been achieved in light of the aforementioned problem, the present invention provides a technique for improving the reliability of communication in a wireless communication system using a simple configuration.

SUMMARY OF THE INVENTION

According to one aspect of the present invention, there is provided a control apparatus comprising: a detection unit configured to detect a control signal that controls a movable portion of a device; and a selection unit configured to select, from a plurality of transmitter stations, a transmitter station that transmits data a plurality of times to a movable station moving in accordance with movement of the movable portion, based on the control signal detected by the detection unit.

According to yet another aspect of the present invention, there is provided a control method of a control apparatus, the method comprising: detecting a control signal that controls a movable portion of a device; and selecting, from a plurality of transmitter stations, a transmitter station that transmits data a plurality of times to a movable station moving in accordance with movement of the movable portion, based on the detected control signal.

Further features of the present invention will become apparent from the following description of exemplary embodiments with reference to the attached drawings.

BRIEF DESCRIPTION OF THE DRAWINGS

FIG. 2 is a block diagram illustrating an example of the configuration of an arm control system.

FIG. 3 illustrates an example of the structure of an arm control signal.

FIG. 6 illustrates an example of information regarding predicted communication quality for each of arm positions.

FIGS. 7A through 7C schematically illustrate relationships between arm positions and the presence/absence of a line-of-sight.

FIG. 8 is a flowchart illustrating operations in an end effector control frame transmission process.

FIG. 9 schematically illustrates operations for transmitting an end effector control frame.

FIG. 10 illustrates an example of information regarding predicted communication quality in the case where an arm operates in accordance with an operation sequence.

FIG. 12 schematically illustrates operations for transmitting an end effector control frame in the case where fixed station selection is executed.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

System Configuration

Figure 1:
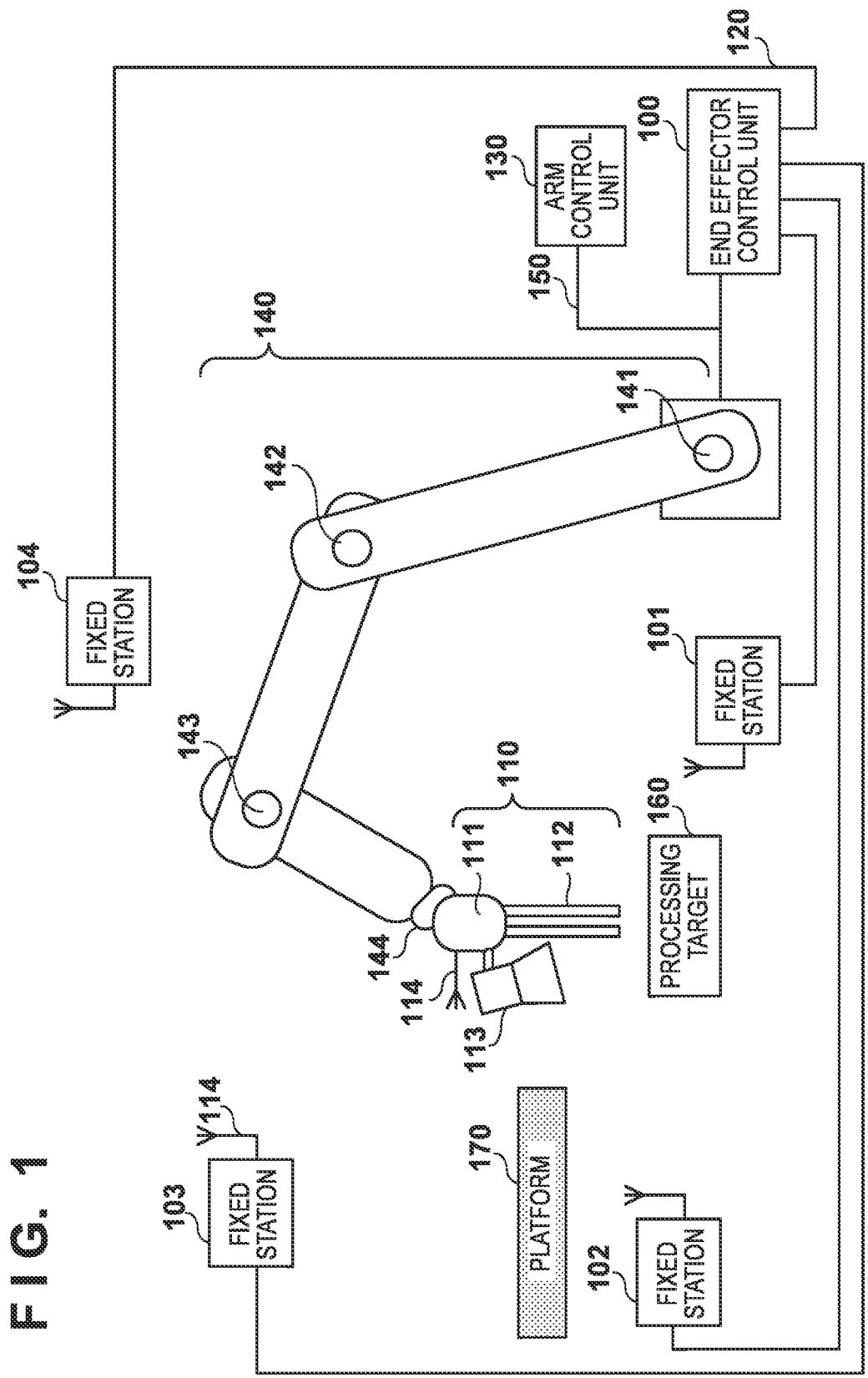
FIG. 1 is a diagram illustrating an example of an overall system configuration.

FIG. 1 is a diagram illustrating an example of the overall configuration of a system that includes a communication system according to the present embodiment. This system uses a device (a robot) including an end effector 110 and an arm 140 to perform a predetermined process on a processing target 160 and place the processing target 160 that has been processed onto a platform 170. The arm 140 includes movable portions (joints), and is capable of changing the location, orientation, and so on of the end effector 110. The end effector 110 includes, for example, a movable station 111, a pincher hand 112, and a camera 113. The movable station 111 is a communication device for performing wireless communication. The pincher hand 112 operates on the processing target 160, and the camera 113 captures that operation.

The system further includes an end effector control unit 100, fixed stations 101 to 104, and an arm control unit 130. The end effector control unit 100 transmits control data for controlling the pincher hand 112 based on predetermined operation sequences. At this time, image data captured by the camera 113 is used as feedback information for the control. For example, the end effector control unit 100 analyzes the image data and performs control so that when it is recognized as a result of the analysis that the tip of the pincher hand 112 has approached the processing target 160, the pincher hand 112 is opened/closed in order to process the processing target 160.

The end effector control unit 100 and the end effector 110 exchange image data and control data, and this communication is carried out using a plurality of fixed stations 101 to 104 placed in predetermined locations around the arm and the movable station 111 provided in the end effector 110. The plurality of fixed stations 101 to 104 and the movable station 111 communicate wirelessly via respective antennas 114. It is assumed that signals are transmitted using millimeter waves in the wireless communication in order to transmit high volumes of image data and to transmit control data at low latencies. Accordingly, the movable station 111 and the fixed stations 101 to 104 have standard modulation/demodulation functions necessary for wireless communication using millimeter waves. However, other frequency bands, such as sub-millimeter waves or optical wireless communication bands, may be used as long as they are used in communication techniques that can handle the transmission of high volumes of data and the transmission of control data at low latencies. Meanwhile, the fixed stations 101 to 104 and the end effector control unit 100 are respectively connected by cables 120.

The arm control unit 130 controls movable portions 141 to 144 of the arm 140 based on the predetermined operation sequences. Motors are installed in the respective movable portions, and the angles of the movable portions can be changed. At least one of the location and orientation of the end effector 110, and consequently at least one of the location and orientation of the movable station 111, is changed as a result of the movement of the movable portions. The movable portion 144 may include a plurality of motors and may be capable of rotating in addition to changing angles. Control data is transmitted to the movable portions 141 to 144 via a bus 150. CAN (Controller Area Network), a standard that is widely used in industrial devices, may be used for the bus 150, or another standard may be used. The end effector control unit 100 is also connected to the bus 150.

Configuration of Arm Control System

FIG. 2 is a block diagram illustrating an example of the configuration of an arm control system. The movable portions 141 to 144 each include a movable control unit 201 and a motor 202 that generates a force for moving the movable portion. If the area of connection between the arm 140 and the end effector 110 is likened to a wrist, in order to change a bend angle of the wrist and a rotational angle of the wrist, the movable portion 144 includes a plurality of the motors 202. At least one of the location and orientation of the end effector 110, and consequently the movable station 111, is changed in accordance with the movement of the motors 202. The arm control unit 130 outputs an arm control signal 300 having a format such as that shown in FIG. 3 to the bus 150, and the arm control signal 300 is then transmitted to the movable control units 201 of the respective movable portions.

The arm control signal 300 is configured so as to include, for example, a header 310 and a payload 320. The header 310 contains an identifier, indicating that that frame is the arm control signal 300, and a checksum. The checksum is, for example, a total value of all bytes of which the arm control signal 300 is comprised. The payload 320 holds set angles for the motors 202 of the movable portions 141 to 144, or in other words, information specifying driving amounts of the motors 202. Here, the motors 202 are, for example, stepping motors, and the information for specifying the set angles is expressed as a number of steps from an origin.

The movable control unit 201 monitors the bus 150 and detects the arm control signal 300, and then determines whether or not that frame has been received without errors based on the checksum and the content of the arm control signal 300. Upon determining that the frame has been received without errors based on the result of the checksum determination, the movable control unit 201 outputs a signal for operating the motor 202 to the motor 202 so that the angle of the movable portion controlled by that movable control unit 201 matches the angle specified in the arm control signal 300.

As described above, by outputting a single arm control signal 300 to the bus, the arm control unit 130 performs control that moves the respective movable portions of the arm 140 to the angles specified in the payload 320 of the arm control signal 300, so that the arm 140 takes on a single position. Through this, at least one of the location and orientation of the end effector is changed, and the processing target 160 is processed.

The arm control unit 130 moves the arm 140 by intermittently transmitting the arm control signal 300 while changing the set angles held in the payload 320 little by little. In the present embodiment, it is assumed that the interval at which the arm control signal is transmitted is sufficiently shorter than the operating speed of the arm. Doing so makes it possible, even in the case where the arm 140 is not at rest in the period from when a first arm control signal is transmitted to when a second arm control signal is transmitted, for the arm 140 to take on a single position during that period. Although not involved in the control of the arm, the end effector control unit 100 monitors the bus 150 and detects the arm control signal 300.

Configuration of End Effector Control System

Figure 4:
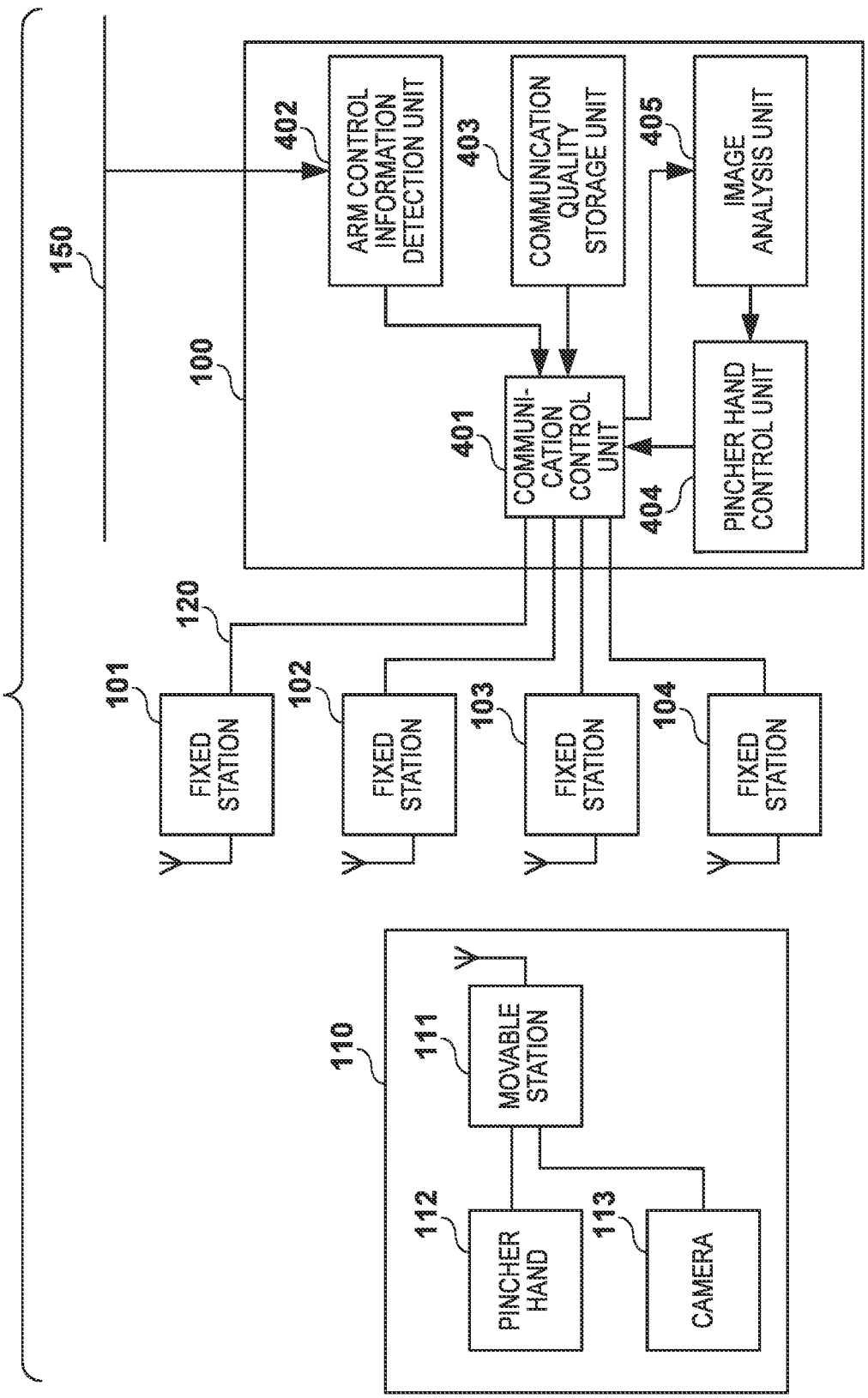
FIG. 4 is a block diagram illustrating an example of the configuration of an end effector control system.

FIG. 4 is a block diagram illustrating an example of the configuration of an end effector control system. The end effector control unit 100 includes, for example, a communication control unit 401, an arm control information detection unit 402, a communication quality storage unit 403, a pincher hand control unit 404, and an image analysis unit 405. The movable station 111 of the end effector 110 wirelessly broadcasts the image data captured by the camera 113 to the fixed stations 101 to 104.

The communication control unit 401 combines the image data received by the fixed stations 101 to 104 and outputs the combined image data to the image analysis unit 405. In the present embodiment, millimeter waves, which have a high degree of straightness in wireless communication, are used, and thus wireless signals do not reach fixed stations in non line-of-sight environment. Meanwhile, even if a fixed station is in a line-of-sight environment, there are cases where the fixed station is influenced by noise from surrounding devices and cannot receive wireless signals at a sufficient level of quality. In the case where, for example, the fixed station 101 can receive only the first half of the image data and the fixed station 104 can receive only the second half of the image data, the communication control unit 401 acquires the correct image data by combining the data that has been successfully received by the two fixed stations.

The image analysis unit 405 analyzes the image data and outputs a result of the analysis to the pincher hand control unit 404. The "result of the analysis" is, for example, information regarding a distance between the pincher hand 112 and the processing target or information regarding whether the pincher hand 112 has properly gripped the processing target. Based on the result of analyzing the image, the pincher hand control unit 404 determines the next operation of the pincher hand 112 and outputs pincher hand control data to the communication control unit 401. The "pincher hand control data" is control information expressing, for example, the degree to which the pincher hand 112 is opened as a numerical value.

Figure 5:
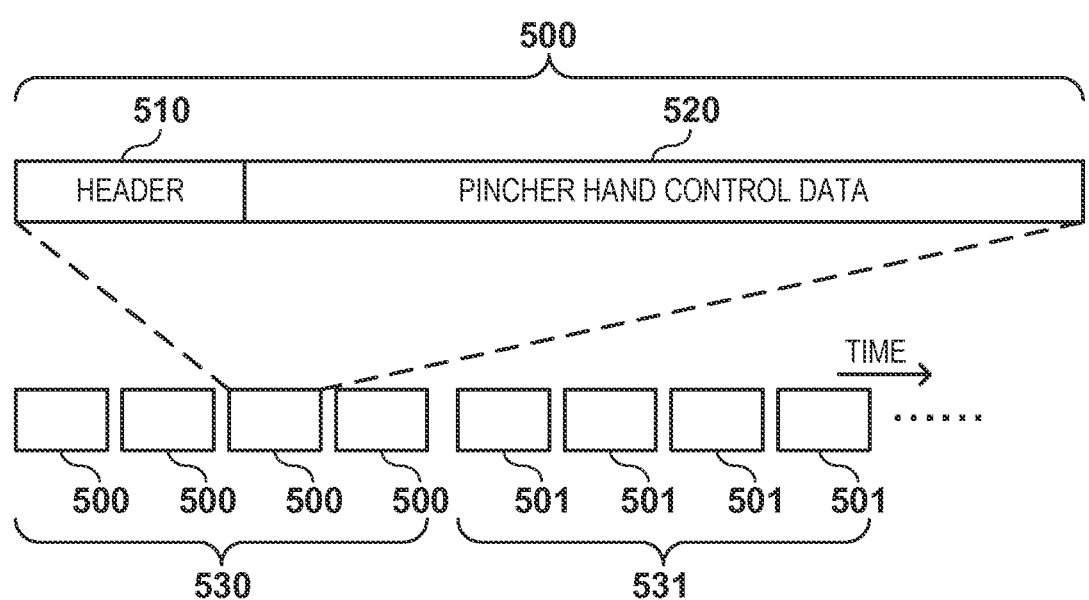
FIG. 5 illustrates an example of the structure of an end effector control frame.

The communication control unit 401 generates an end effector control frame by adding a header to the pincher hand control data, and transmits the end effector control frame to the movable station 111. FIG. 5 illustrates an example of the structure of an end effector control frame 500. The end effector control frame 500 is configured so as to include a header 510 and a payload 520. The header 510 contains an identifier, indicating that the frame is an end effector control frame, and a checksum. The checksum is calculated by, for example, performing mutually exclusive OR operations on all bytes of which the end effector control frame 500 is comprised. Alternatively, cyclic code can also be used for such a checksum. The pincher hand control data obtained from the pincher hand control unit 404 is held in the payload 520.

Here, the communication control unit 401 switches among the fixed stations 101 to 104 in time-division based on a predetermined algorithm, continuously transmitting a single end effector control frame containing the same payload a plurality of times. Details of the algorithm will be given later. Although there will be uncertainty as to whether or not the wireless signal has been successfully received, providing redundancy by transmitting an end effector control frame containing the same payload a plurality of times makes it possible to improve the reliability of communication. The communication control unit 401 adds a frame ID to the header 510 to indicate which end effector control frames contain the same payload. In other words, frames having identical IDs contain identical payloads. Here, a collection of a plurality of continuously-transmitted end effector control frames having identical IDs will be referred to as a superframe. FIG. 5 illustrates a superframe 530 configured of four end effector control frames 500 having identical IDs, and a superframe 531 similarly configured of four end effector control frames 501 having identical IDs. In the present embodiment, the superframes are transmitted using a high-speed communication technique so that the time length of a superframe is shorter than, for example, both the period in which the arm control signal is transmitted and the period in which the pincher hand control data is output.

Upon successfully receiving the end effector control frame, the movable station 111 extracts the pincher hand control data and outputs a signal for causing the pincher hand 112 to operate based on the extracted data. Here, whether or not the frame has been successfully received is determined using the checksum. In the case where end effector control frames having identical IDs have been successfully received a plurality of times, the second and subsequent received frames are discarded. The end effector 110 is controlled, and processing carried out, by repeating the aforementioned operations every predetermined cycle.

The arm control information detection unit 402 detects the arm control signal transmitted over the bus 150 for arm control. In other words, the arm control information detection unit 402 detects control signals for controlling each of the movable portions 141 to 144. The set angles of the movable portions 141 to 144 included in that frame are then communicated to the communication control unit 401 as a single set. The communication quality storage unit 403 stores, for each combination serving as single set of the set angles for the movable portions 141 to 144, or in other words, for each arm position, information of a communication quality predicted to be obtained between the fixed stations 101 to 104 and the movable station 111 in that position (that is, a predicted communication quality).

FIG. 6 illustrates an example of predicted communication quality information 600 that has been predicted for each arm position and that is stored in the communication quality storage unit 403. In the information 600, a single row 610 indicates predicted communication qualities 612 predicted to be obtained between each of the fixed stations 101 to 104 and the movable station 111 when the arm has taken on a position indicated by a combination 611 of the set angles for the movable portions 141 to 144. The predicted communication quality is expressed as a binary value, in which, for example, 1 indicates that a predetermined communication quality will be satisfied in the case where it is considered highly probable that normal communication will be successful, and 0 indicates that the predetermined communication quality will not be satisfied in other cases. This binary predicted communication quality may, for example, indicate 1 in the case where a line-of-sight can be ensured and indicate 0 when the line-of-sight cannot be ensured, or may indicate 1 in the case where a probability that a signal-to-noise ratio (SNR) will be of a desired quality is greater than or equal to a predetermined probability and indicate 0 when the probability is less than the predetermined probability. Furthermore, the predicted communication quality may indicate 0 in the case where a station is in a non line-of-sight environment and a quality such as a SNR is less than or equal to a predetermined value, and may indicate 1 when such is not the case. In addition to a binary value, the predicted communication quality may be expressed using, for example, information indicating a success rate of communication, information indicating an average SNR or the like, and so on. Note that in the case where information aside from a binary value is used, an operation for extracting a fixed station whose predicted communication quality is, for example, greater than or equal to a predetermined value is executed instead of an operation for extracting a fixed station whose predicted communication quality is 1 (this will be described later).

Figure 7A:
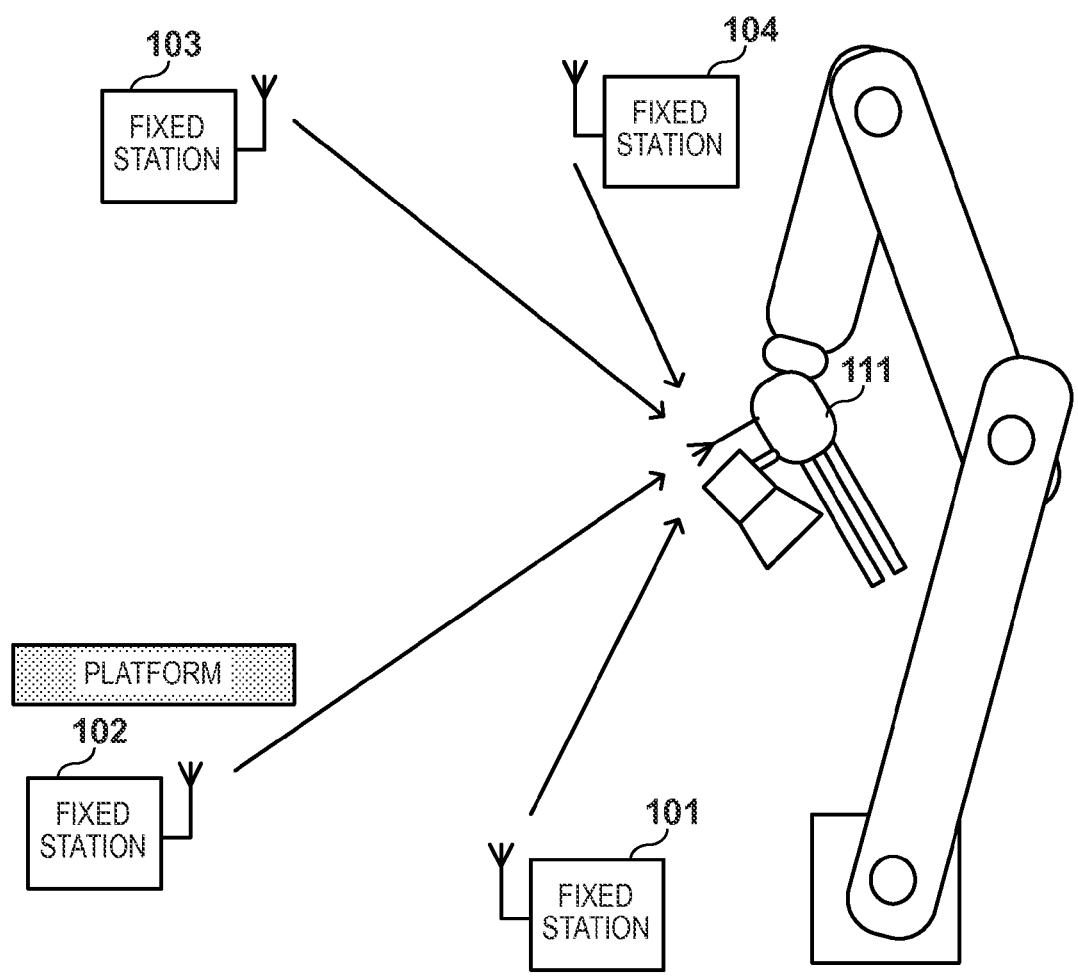
Figure 7B:
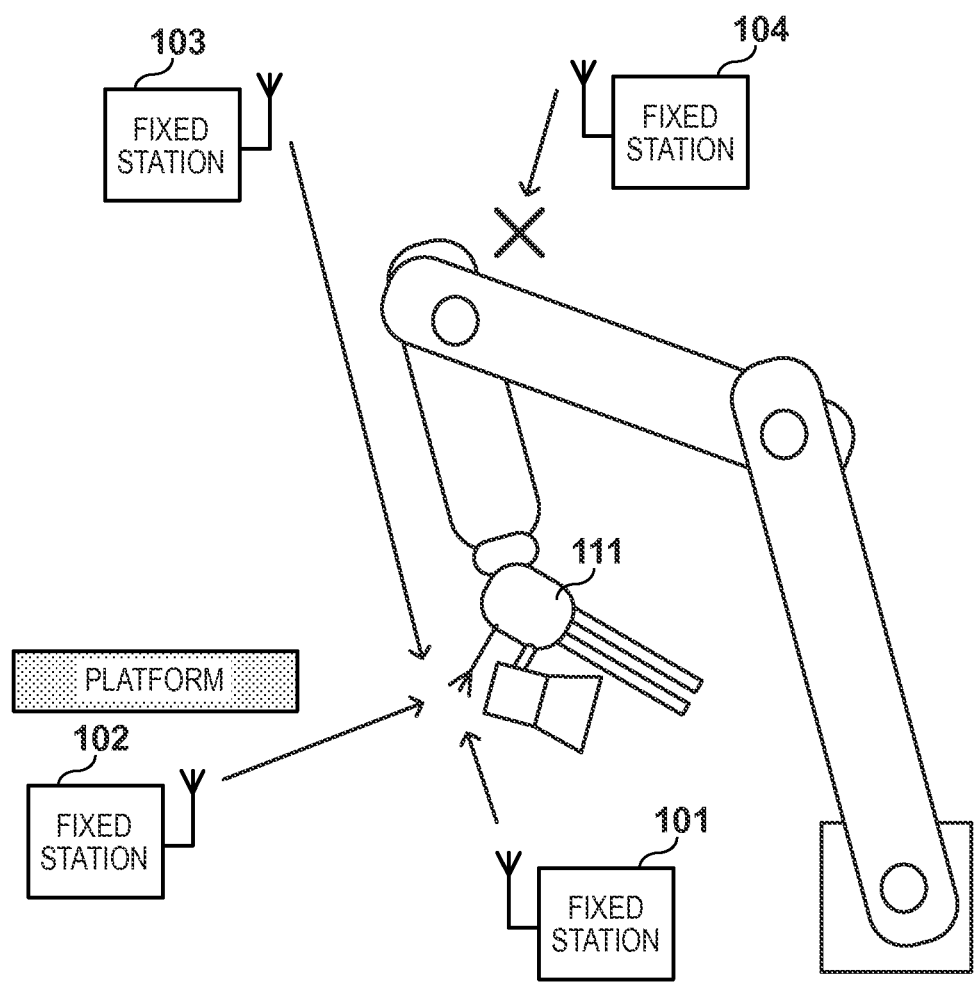

FIGS. 7A to 7C are diagrams schematically illustrating relationships between arm positions and the presence/absence of lines of sight between the fixed stations 101 to 104 and the movable station 111 during those arm positions. The arm takes on a position such as that shown in FIG. 7A for the combination 611 of the set angles for the movable portions 141 to 144 indicated in FIG. 6. In FIG. 7A, lines of sight are secured between the antennas of all of the fixed stations 101 to 104 and the antenna of the movable station 111. Accordingly, the predicted communication quality for each of the fixed stations 101 to 104 is 1, as indicated by, for example, the predicted communication qualities 612 in FIG. 6. Note that here, for the sake of simplicity, the predicted communication quality is set to 1 in the case where a line-of-sight is secured in a two-dimensional space. Because CAD data including three-dimensional information is normally used when determining the trajectory of an arm, such CAD data may be used to determine whether or not a line-of-sight is present, and the predicted communication quality may then be determined.

Next, the arm takes on a position such as that shown in FIG. 7B for a combination 621 of the set angles for the movable portions 141 to 144 indicated in a row 620 in FIG. 6. In FIG. 7B, the fixed station 104 and the movable station 111 are in a non line-of-sight relationship, and thus the predicted communication quality of the fixed station 104 is 0, as indicated by predicted communication qualities 622 in FIG. 6. Likewise, the arm takes on a position such as that shown in FIG. 7C for a combination 631 of the set angles for the movable portions 141 to 144 indicated in a row 630 in FIG. 6. In FIG. 7C, a line-of-sight to the movable station 111 can be secured only for the fixed stations 103 and 104, and thus, as indicated by predicted communication qualities 632 in FIG. 6, the predicted communication qualities for those fixed stations is 1, whereas the predicted communication qualities for the fixed stations 101 and 102 is 0.

In this manner, the communication quality storage unit 403 stores relationships between the set angles for the movable portions 141 to 144 and the predicted communication quality, for all cases that can arise when transmitting signals from the fixed stations 101 to 104 to the movable station 111. In the case where the predicted communication quality is determined based on the presence/absence of a line-of-sight, the predicted communication quality can, as mentioned earlier, be found in advance based on CAD data, and can therefore be set in the communication quality storage unit 403 prior to the start of arm operations. Note that in the case where the predicted communication quality is determined based on information aside from the presence/absence of a line-of-sight, for example, a training period in which a test signal is exchanged for each arm position may be provided prior to actually processing the processing target 160. In this case, the predicted communication quality in the actual environment can be acquired based on results of the training.

End Effector Control Frame Transmission Process

Next, a process performed when the communication control unit 401 transmits the end effector control frame to the movable station 111 via the fixed stations 101 to 104 will be described using FIG. 8. FIG. 8 is a flowchart illustrating the process for transmitting the end effector control frame. Note that in FIG. 8, the respective fixed stations connected to the communication control unit 401 will be indicated as fixed stations i (where i=0, 1, and so on up to N−1, and N indicates the total number of fixed stations connected to the communication control unit 401). For example, with the configuration illustrated in FIG. 1, the fixed station i corresponds to the fixed station 101 when i=0, the fixed station 102 when i=1, the fixed station 103 when i=2, and the fixed station 104 when i=3. In this case, N=4.

When the process is started, first, the communication control unit 401 determines whether or not data to be transmitted has been generated, or in other words, whether or not the pincher hand control data has been received from the pincher hand control unit 404 (S801). In the case where data to be transmitted has been generated (Yes in S801), the communication control unit 401 adds a header and generates the end effector control frame. Here, the communication control unit 401 adds an ID that is different from that used in the previously-generated end effector control frame to the header (S802). Note that in the case where the data to be transmitted has not been generated (No in S801), the communication control unit 401 stands by for the data to be transmitted, which will be received from the pincher hand control unit 404.

Next, the communication control unit 401 acquires, from the information 600 stored in the communication quality storage unit 403, the predicted communication quality information corresponding to the arm position specified by the arm control signal last received from the arm control information detection unit 402 (S803). In other words, the communication control unit 401 acquires the predicted communication quality information in accordance with the arm position specified at the point in time when the data to be transmitted was generated. The communication control unit 401 then resets the variable i to 0 (S804), and determines whether or not the predicted communication quality of the fixed station i is 1 in the acquired predicted communication quality information (S805). In the case where the predicted communication quality is 1 (Yes in S805), the communication control unit 401 allocates a time-division time segment to the fixed station i, causes the fixed station i to transmit the end effector control frame during that time segment (S806), and advances the process to S809. On the other hand, in the case where the predicted communication quality is 0 (No in S805), it is determined whether or not there is another fixed station that has a predicted communication quality of 1 (S807). In the case where there are other fixed stations that have a predicted communication quality of 1 (Yes in S807), the communication control unit 401 allocates a time-division time segment to one of those fixed stations, causes that fixed station to transmit the end effector control frame in that time segment (S808), and advances the process to S809. On the other hand, in the case where there are no other fixed stations that have a predicted communication quality of 1 (No in S807), the communication control unit 401 allocates a time segment to the fixed station i, causes the fixed station i to transmit the end effector control frame (S806), and advances the process to S809. In S809, 1 is added to i (S809), i is compared to the total number N of fixed stations (S810), and the process returns to S801 in the case where i=N (Yes in S810). However, in the case where i has not reached N (No in S810), the process returns to S805, and the process for selecting the fixed station to transmit the signal in the next time segment is continued. Through the above processing, the processes of S805 to S810 are executed once for all of the fixed stations connected to the communication control unit 401.

The operations by which the communication control unit 401 transmits the end effector control frame as described above will be illustrated using FIG. 9. FIG. 9 schematically illustrates operations for transmitting the end effector control frame. In FIG. 9, it is assumed that an arm control command specifying the position illustrated in FIG. 7A has been detected at a time T1 and the pincher hand control data has been output from the pincher hand control unit 404 at a time T2. In the present embodiment, the position illustrated in FIG. 7A is, as described above, specified by the combination 611 of the set angles for the movable portions 141 to 144 shown in FIG. 6. At this time, the information acquired in S803 is the row 610, and thus the processing from S804 on is executed based on the predicted communication qualities 612 in the row 610. According to the predicted communication qualities 612, the predicted communication qualities for the fixed stations 101 to 104 are all 1, and thus in the loop from S805 to S810, time segments are allocated to all of the fixed stations i and the end effector control frame is transmitted from each of the fixed stations i. As a result, as indicated in the left half of FIG. 9, an end effector control frame 911 that contains the same payload is transmitted one time each in time-division from the fixed station 101, the fixed station 102, the fixed station 103, and the fixed station 104, in that order, in a single superframe 910. Note that the payload of the end effector control frame 911 is the pincher hand control data output from the pincher hand control unit 404 at the time T2.

Next, operations performed in the case where an arm control command specifying the position illustrated in FIG. 7B is transmitted at a time T3 shown in FIG. 9 and the pincher hand control data is output from the pincher hand control unit 404 at a time T4 will be described. First, a header containing a different ID from that used in the case illustrated in FIG. 7A is added in S802. In the present embodiment, the position illustrated in FIG. 7B is, as described above, specified by the combination 621 of the set angles for the movable portions 141 to 144 shown in FIG. 6. Accordingly, the information acquired in S802 is the row 620, and thus the processing from S803 on is executed based on the predicted communication qualities 622 in the row 620.

According to the predicted communication qualities 622, the predicted communication quality for the fixed station 104 is 0, and thus the processes of S807 and S808 are executed for the fixed station 104. It is determined, in S807, that other fixed stations having predicted communication qualities of 1 (that is, the fixed stations 101, 102, and 103) are present. Accordingly, in S808, the fixed station 103, for example, is selected as one of the other fixed stations whose predicted communication quality is 1, and thus the time segment used for the fixed station 104 is instead allocated to the fixed station 103. Note that the selection may be carried out at random, or the selection may be performed in accordance with a predetermined rule. As a result, as indicated in the right half of FIG. 9, the end effector control frame is transmitted from the fixed station 101, the fixed station 102, and the fixed station 103 in that order, and then the end effector control frame is once again transmitted from the fixed station 103 instead of the fixed station 104. In this case as well, an end effector control frame 921 is transmitted four times in time-division in a superframe 920.

According to the present embodiment, in the case where there is a fixed station that is located in a non line-of-sight position and that has a low probability of successful communication, the communication control unit 401 automatically detects that fixed station, and instead of from that fixed station, the end effector control frame is transmitted a plurality of times from a fixed station that has a high probability of communicating successfully. Through this, the reliability of communication can be improved. In addition, because the presence/absence of a line-of-sight is detected using a signal conventionally used for arm control instead of adding a location detection mechanism to the movable station 111, the system of the present embodiment can be constructed based on a conventional system with a minimum added cost. Furthermore, using a plurality of fixed stations that have high probabilities of successful communication makes it possible to achieve a spatial diversity effect for responding to noise and the like. In this manner, according to the technique described in the present embodiment, the reliability of communication can be improved while suppressing costs in a wireless communication system used in an industrial device.

Although the above descriptions mention four movable portions in the arm, it should be noted that the number of movable portions need not be four; furthermore, the operating mechanism is not limited to an arm system, and may employ, for example, a gantry system. Furthermore, the system may be such that the platform 170 shown in FIG. 1 is mobile, the arm control unit 130 controls the platform 170, and the platform 170 is moved in synchronization with the operation of the arm 140. In other words, regardless of what type of operating mechanism is used, the technique described in the present embodiment can transmit a single signal a plurality of times from a fixed station predicted to have a high communication quality, based on a relationship between the position of a robot and the predicted communication qualities between a movable station and a plurality of fixed stations when the robot is in that position.

Furthermore, the data transmitted as the payload of the end effector control frame is not limited to the pincher hand control data. For example, camera control data for causing the camera 113 to start or stop image transmission or the like may be included as the payload of the end effector control frame. In other words, the technique of the present embodiment can be applied regardless of the content of the payload of the end effector control frame, and can therefore improve the reliability of communication. Furthermore, in the case where the arm operates at a sufficiently low speed, it can be thought that few cases will arise where the communication environment changes significantly between a plurality of sequential positions. In this case, even if the arm control signal is transmitted while the superframe is being transmitted, it is thought that there will be no significant change in the position. Accordingly, in this case, the time length of the superframe may be longer than the interval at which the arm control signal is transmitted.

Furthermore, although the above descriptions discuss an example in which four time segments are allocated to four fixed stations, the present invention is not limited thereto. For example, three time segments may be allocated to the four fixed stations. In this case, three fixed stations are selected from among the fixed stations that satisfy the predetermined communication quality condition. Alternatively, five time segments may be allocated to the four fixed stations. Further still, the number of fixed stations may be increased or decreased. Regardless of which scenario is employed, a plurality of time segments are allocated to fixed stations that satisfy the predetermined communication quality condition, time segments are not allocated to fixed stations that do not satisfy the predetermined communication quality condition, and a single piece of data is transmitted a plurality of times. Even in these cases, a plurality of fixed stations that have a high probability of communicating successfully are used, and thus the spatial diversity effect can be achieved.

Second Embodiment

The present embodiment will describe a system in which the arm 140 illustrated in FIG. 1 operates according to a predefined sequence. With this system, the content of the arm control signal output from the arm control unit 130 changes in the same manner with each sequence of operations. In the field of industrial devices, such cases in which the arm performs the same operations every time are comparatively numerous. In the present embodiment, this property will be used to achieve the same effects as those of the first embodiment, with a simpler configuration. The following will describe areas that are different from the first embodiment.

The arm control information detection unit 402 counts the number of times the arm control signal has been detected on the bus 150, and communicates the count value to the communication control unit 401. In the case where the power being turned on has been detected, the case where a predetermined arm control signal has been detected on the bus 150, or the like, the arm control information detection unit 402 resets the count value to 1. Note that the "predetermined arm control signal" is an arm control signal in which the payload 320 contained in that frame is data specifying the initial position of a predefined operation sequence. However, rather than using the predetermined arm control signal, the count value may be reset to 1 in the case where a predetermined count value has been reached after counting up from a count value of 1.

Here, the initial position in the predefined arm operation sequence is assigned the number 1, the next position is assigned a number 2, and so on in order of the operations in the sequence, up to the final number; these numbers will be referred to as "operation sequence numbers". Here, a single position is specified by a single arm control signal, and the count value always matches the operation sequence number related to the next operation of the arm.

The communication quality storage unit 403 stores information 1000 regarding predicted communication quality for each operation sequence number, as indicated in FIG. 10. This information is configured so as to include, in each row, a single operation sequence number 1011 and predicted communication qualities 1012 based on an arm position specified by that operation sequence number. For example, in a row 1010, the predicted communication qualities 1012 between each of the plurality of the fixed stations and the movable station are stored in correspondence with the arm position for the case where the operation sequence number is 1. Likewise, in a row 1020, predicted communication qualities 1022 between each of the plurality of the fixed stations and the movable station are stored in correspondence with the arm position for the case where the operation sequence number is K. The same applies to the other rows as well.

Here, it is assumed that the initial position in the predefined operation sequence, or in other words, the position specified by the operation sequence number 1, is a position such as that shown in FIG. 7A. In FIG. 7A, a line-of-sight is secured between all of the fixed stations 101 to 104 and the movable station 111, and thus the values of the predicted communication qualities 1012 are all 1. Meanwhile, it is assumed that the position specified by the operation sequence number K is a position such as that shown in FIG. 7B. In this case, based on the relationships between the presence/absence of lines of sight between the respective fixed stations 101 to 104 and the movable station 111, the values of the predicted communication qualities 1022 are 1 for the fixed stations 101 to 103 and 0 for the fixed station 104. In S803 of FIG. 8, the communication control unit 401 uses the first count value acquired from the arm control information detection unit 402, or in other words, the operation sequence number, and acquires the predicted communication qualities for the position corresponding to the operation sequence number from the communication quality storage unit 403.

Here, operations performed in the case where the arm is in the position shown in FIG. 7A and the pincher hand control data is transmitted to the movable station 111 will be described. Immediately prior to the arm taking on the position illustrated in FIG. 7A, the arm control signal corresponding to that position is output to the bus 150. Note that if it is assumed that the position illustrated in FIG. 7A is the initial position of the arm, the arm control signal corresponding thereto is the aforementioned predetermined arm control signal. Upon detecting this frame, the arm control information detection unit 402 recognizes that the position specified by that frame is the initial position in the predefined operations. The arm control information detection unit 402 then resets the count value to 1 and communicates the operation sequence number 1 to the communication control unit 401.

In S803, the communication control unit 401 acquires the predicted communication qualities 1012 corresponding to the operation sequence number 1. The predicted communication qualities 1012 indicate that the predicted communication qualities for the fixed stations 101 to 104 are all 1, or in other words, that the predetermined communication quality is satisfied. Accordingly, in the loop from S805 to S810, the communication control unit 401 executes the processing of S806 on each of the fixed stations 101 to 104, allocates time segments for time-division transmission one at a time, and does not execute the processes indicated in S807 and S808. Through this, the end effector control frame is transmitted from the fixed stations to which the time segments have been allocated a total of four times, in the time segments that have been allocated to the fixed station 101, the fixed station 102, the fixed station 103, and the fixed station 104, in that order.

Operations performed in the case where the arm is in the position shown in FIG. 7B and the pincher hand control data is transmitted to the movable station 111 will be described next. Here, it is assumed that the position shown in FIG. 7B is, as described above, a Kth position in the operation sequence. K arm control signals, including the predetermined arm control signal, are detected from when the predetermined arm control signal is detected to when the arm takes on the position shown in FIG. 7B. Immediately prior to the arm taking on the position shown in FIG. 7B, the arm control information detection unit 402 communicates the count value at that point in time, or in other words, the operation sequence number K, to the communication control unit 401.

In S803, the communication control unit 401 acquires the predicted communication qualities 1022 corresponding to the operation sequence number K. Here, the predicted communication qualities 1022 indicate that the predicted communication qualities for the fixed stations 101 to 103 are 1, or in other words, that the predetermined communication quality is satisfied, and indicate that the predicted communication quality for the fixed station 104 is 0, or in other words, that the predetermined communication quality is not satisfied. Accordingly, in the loop from S805 to S810, the communication control unit 401 executes the processes of S807 and S808 for the fixed station 104 only, and allocates the time segment for the fixed station 104 to another fixed station. The communication control unit 401 then executes the process of S806 for the other fixed stations, and allocates a single time segment to each of those fixed stations. In S808, the communication control unit 401 selects, for example, the fixed station 103 as the other fixed station whose predicted communication quality is 1. Through this, the end effector control frame is transmitted from the fixed stations to which the time segments have been allocated a total of four times, in the time segments that have been allocated to the fixed station 101, the fixed station 102, the fixed station 103, and the fixed station 103, in that order.

The result is the same as the result when the first embodiment is employed, and the effects that are achieved are the same as well. According to the present embodiment, compared to the first embodiment, the information 1000 that has a smaller amount of information is used instead of the information 600; as a result, the information to be stored in the communication quality storage unit 403 is reduced, and the cost of components such as memories for storing the communication qualities can be reduced. Furthermore, by arranging the operation sequence numbers and the information 1000 in ascending order from 1, the processing burden placed on the communication control unit 401 for acquiring the information regarding the predicted communication quality in S803 can be lightened. Accordingly, a lower-cost component can be used for the communication control unit 401.

Although the present embodiment describes the operation sequence numbers as being obtained by the arm control information detection unit 402 counting the number of arm control signals, it should be noted that, for example, the operation sequence number may be included in the header 310 of the arm control signal 300. In this case, for example, the arm control information detection unit 402 can acquire the arm control signal 300 from the bus 150, and can then acquire the operation sequence number by reading the header 310 thereof.

Third Embodiment

The present embodiment obtains an even better spatial diversity effect by preventing the end effector control frame from being sequentially transmitted from the same fixed station when transmitting a plurality of times from a fixed station whose communication quality is predicted to be good. The following will describe areas that are different from the first embodiment.

Figure 11:
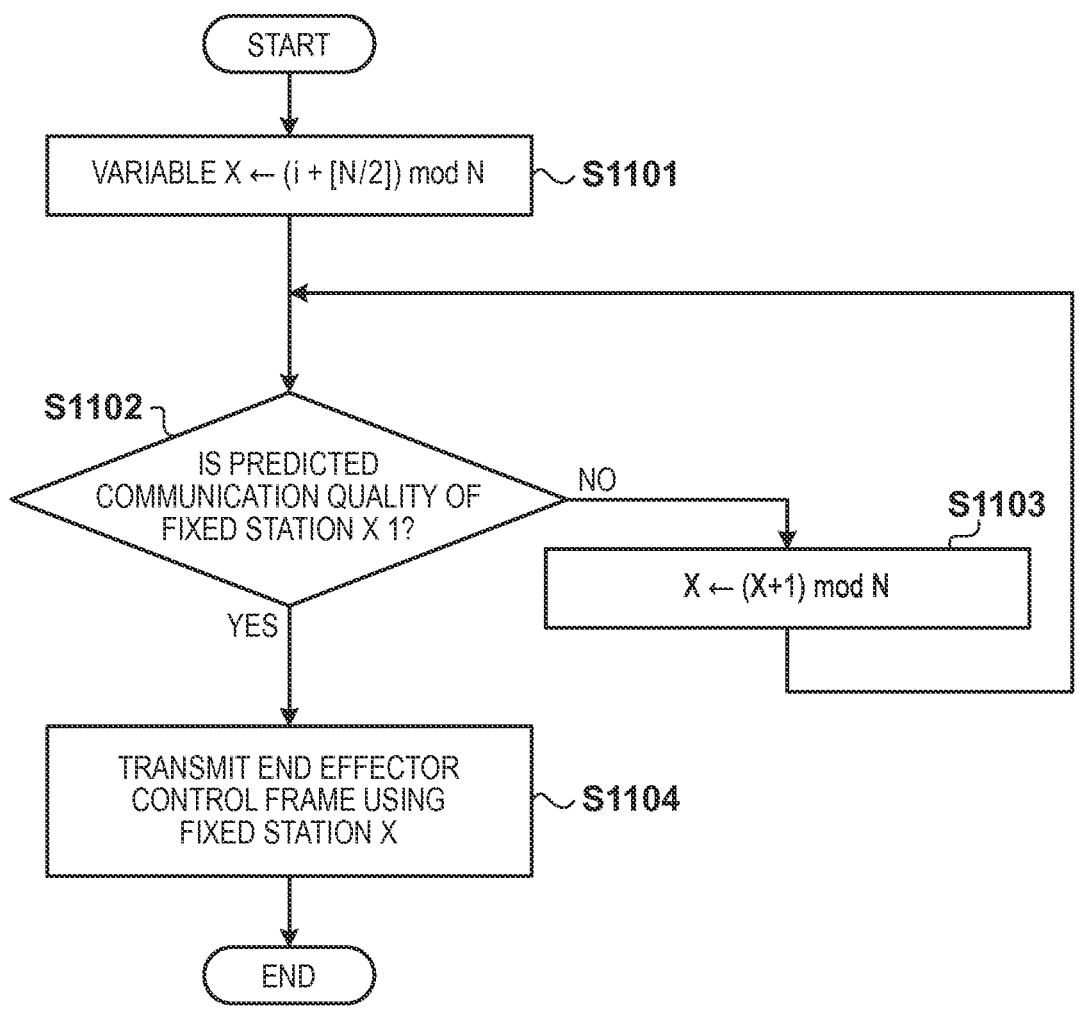
FIG. 11 is a flowchart illustrating operations in a process for selecting a fixed station to transmit an end effector control frame.

In S808 of FIG. 8, the communication control unit 401 selects, based on the algorithm illustrated in FIG. 11, another single fixed station whose predicted communication quality is 1. The processing illustrated in FIG. 11 is started as a result of the process of S808 in FIG. 8 being started. The communication control unit 401 defines a variable X, and substitutes $((i+[N/2]) \bmod N)$ for X (S1101). Here, the value i is i at the point in time when the process of S808 in FIG. 8 is started. N, meanwhile, expresses the total number of fixed stations. mod represents a modulo operation, and thus (A mod B) represents a remainder obtained when A is divided by B. Meanwhile, [N/2] is the maximum integer that does not exceed N/2. Next, the communication control unit 401 acquires the predicted communication quality of a fixed station X from the information 600, and in the case where the predicted communication quality is 1 (Yes in S1102), the communication control unit 401 allocates a time segment to the fixed station X, causes the fixed station X to transmit the end effector control frame, and advances the process to S809 (S1104). On the other hand, in the case where the predicted communication quality is 0 (No in S1102), $((X+1) \bmod N)$ is taken as the new value of X (S1103), and the process returns to S1102.

An example of the operations described above will be explained using FIG. 12. FIG. 12 schematically illustrates operations for transmitting the end effector control frame in the case where a fixed station selection process according to the present embodiment is used. First, operations performed in the case where the superframe 910 is transmitted when the arm is in the position illustrated in FIG. 7A will be described. When the arm is in the position illustrated in FIG. 7A, the predicted communication qualities for all of the fixed stations are 1, and thus the process of S808, or in other words, the processing illustrated in FIG. 11, is not executed. Accordingly, the result is the same as in the first embodiment, as indicated by the superframe 910 in FIG. 12.

Next, operations performed in the case where the superframe 920 is transmitted when the arm is in the position illustrated in FIG. 7B will be described. When the arm is in the position illustrated in FIG. 7B, the predicted communication quality for only the fixed station 104 is 0, and thus the process of S808, or in other words, the processing illustrated in FIG. 11, is executed. The fixed station 104 corresponds to i=3. Note that because there are four fixed stations, N=4. Accordingly, in S1101, $((3+[4/2]) \bmod 4) = 1$ is calculated, and this is substituted for X. At this time, the fixed station X (X=1) corresponds to the fixed station 102, and because the predicted communication quality thereof is 1, in S1104, a time segment is allocated to the fixed station 102, and the end effector control frame is transmitted from the fixed station 102. In other words, as indicated by the superframe 920 in FIG. 12, the fixed station 102 transmits the end effector control frame instead of the fixed station 104.

Finally, operations performed in the case where a superframe 1210 is transmitted when the arm is in the position illustrated in FIG. 7C will be described. When the arm is in the position illustrated in FIG. 7C, the predicted communication qualities of the fixed station 101 and the fixed station 102 are 0, and thus the process of S808 is executed. The fixed station 101 corresponds to i=0, and thus in S1101 of FIG. 11, ((0+[4/2])mod 4)=2 is calculated and substituted for X. The fixed station X (X=2) corresponds to the fixed station 103. Because the predicted communication quality of the fixed station 103 is 1, in S1104, a time segment is allocated to the fixed station 103 and the fixed station 103 transmits the end effector control frame. Meanwhile, the fixed station 102 corresponds to i=1, and thus in S1101, 3 is substituted for X. The fixed station X (X=3) corresponds to the fixed station 104. Because the predicted communication quality of the fixed station 104 is 1, in S1104, a time segment is allocated to the fixed station 104 and the fixed station 104 transmits the end effector control frame. In other words, the fixed station 103 transmits the end effector control frame instead of the fixed station 101, and the fixed station 104 transmits the end effector control frame instead of the fixed station 102. As a result, as indicated by the superframe 1210 in FIG. 12, time segments are allocated to the fixed station 103, the fixed station 104, the fixed station 103, and the fixed station 104 in that order, and an end effector control frame 1211 having the same payload is transmitted a plurality of times.

Here, the operational results of the superframe 920 in FIG. 9 in FIG. 12 will be compared. In FIG. 9, which indicates the operational result of the first embodiment, two end effector control frames are transmitted sequentially from the fixed station 103; on the other hand, in FIG. 12, which indicates operational result of the present embodiment, end effector control frames are not transmitted sequentially from the same fixed station. Likewise, with respect to the superframes 910 and 1210, in the present embodiment, end effector control frames are not transmitted sequentially from the same fixed station.

Note that in the case where, for example, lines of sight cannot be secured between the fixed stations 102 and 104 and the movable station 111 but lines of sight can be secured with the fixed stations 101 and 103, X calculated in S1101 for the fixed station 102 (i=1) becomes 3. However, in this case, the fixed station 104 that corresponds to X=3 is in a non line-of-sight environment, and thus the predicted communication quality is 0 (No in S1102). In this case, in S1103, ((3+1)mod 4)=0 is calculated and 0 is substituted for X. Then, because the predicted communication quality of the fixed station 101 that corresponds to X=0 is 1 (Yes in S1102), the fixed station 101 transmits the end effector control frame (S1104). In other words, the fixed station 101 transmits the end effector control frame instead of the fixed station 102. Likewise, the fixed station 103 transmits the end effector control frame instead of the fixed station 104.

In this case, the fixed station 101, the fixed station 101, the fixed station 103, and the fixed station 103 transmit the end effector control frame in that order, and thus the same fixed stations transmit the frame sequentially. However, this situation arises because there are four fixed stations, and thus providing more than four fixed stations and then applying the technique of the present embodiment makes it possible to sufficiently reduce the probability that the same fixed station will sequentially transmit the end effector control frame. Furthermore, this type of situation only arises in the case where only the fixed station 101 and the fixed station 103 are capable of line-of-sight communication or the case where only the fixed station 102 and the fixed station 104 are capable of line-of-sight communication. Accordingly, this situation can be prevented from occurring by disposing the respective fixed stations so that the fixed station 101 and the fixed station 103 are not situated in the non line-of-sight condition at the same time, or so that the fixed station 102 and the fixed station 104 are not situated in the non line-of-sight condition at the same time.

In this manner, by implementing the algorithm according to the present embodiment in the communication control unit 401, the end effector control frame can be prevented from being transmitted sequentially from the same fixed station, which makes it possible to improve the spatial diversity effect. Through this, even in the case where a burst of noise has been produced by a device near a fixed station when that fixed station transmits the end effector control frame, the next end effector control frame is transmitted from a different fixed station. As a result, the influence of the burst of noise can be reduced, which makes it possible to improve the communication quality.

Although the above descriptions mention executing a calculation such as that in S1101 and not transmitting the end effector control frame from the same fixed station in sequential time segments, it should be noted that such a calculation need not be executed. For example, control may be carried out so that different fixed stations communicate in sequential time segments by excluding fixed stations that transmitted the end effector control frame in the previous time segment from candidate fixed stations to which time segments are to be allocated. In other words, for example, in the case where a given fixed station has transmitted end effector control frame, the next time segment may be allocated to a different fixed station that has a predicted communication quality of 1. For example, in the case where lines of sight cannot be secured between the fixed stations 102 and 104 and the movable station 111 but lines of sight can be secured between the fixed stations 101 and 103 and the movable station 111, a time segment may first be allocated to the fixed station 101. Then, the next time segment is allocated to the fixed station 103, which is a fixed station that is different from the fixed station 101 and that has a predicted communication quality of 1. Furthermore, the next time segment after that is allocated to the fixed station 101, which is a fixed station that is different from the fixed station 103 and that has a predicted communication quality of 1. Doing so makes it possible to ensure that signals are transmitted from different fixed stations in sequential time segments.

According to the present invention, it is possible to improve the reliability of communication using a simple configuration in a wireless communication system included in an industrial device.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-104887 filed on May 1, 2012, which is hereby incorporated by reference herein in its entirety.

What is claimed is:

1. A control apparatus comprising:
a controller configured to control a plurality of fixed stations, which transmit same data to a single movable station via wireless communication; and
a selection unit configured to select, from the plurality of fixed stations, a fixed station that repeatedly transmits said same data a plurality of times to the single movable station in accordance with movement of the movable station,
wherein the controller controls the plurality of fixed stations in accordance with the selection by the selection unit, and
wherein the selection unit selects the fixed station that repeatedly transmits the same data a plurality of times, based on communication qualities in communications between the single movable station and each of the plurality of fixed stations in accordance with movement of the movable station.

2. The control apparatus according to claim 1,
wherein the selection unit is configured not to select, in the case where a communication quality between at least one of the plurality of fixed stations and the movable station does not satisfy a predetermined communication quality condition, the at least one of the plurality of fixed stations.

3. The control apparatus according to claim 1,
wherein the controller is configured to allocate, to each of the plurality of fixed stations, a time period for transmitting data.

4. A control method of a control apparatus that comprises a controller configured to control a plurality of fixed stations, which transmit same data to a single movable station via wireless communication, the method comprising:
selecting, from the plurality of fixed stations, a fixed station that repeatedly transmits said same data a plurality of times to the single movable station in accordance with movement of the movable station; and
controlling, by the controller, the plurality of fixed stations in accordance with the selection in the selecting,
wherein in the selecting, the fixed station that repeatedly transmits the same data a plurality of times is selected, based on communication qualities in communications between the single movable station and each of the plurality of fixed stations in accordance with movement of the moveable station.

5. The control method according to claim 4,
wherein in the case where a communication quality between at least one of the plurality of fixed stations and the movable station does not satisfy a predetermined communication quality condition, the at least one of the plurality of fixed stations is not selecting in the selecting.

6. The control method according to claim 4,
wherein a time period for transmitting data is allocated to each of the plurality of fixed stations.

7. A non-transitory computer-readable storage medium storing a computer program for causing a computer to function as;
a controller configured to control a plurality of fixed stations, which transmit same data to a single movable station via wireless communication; and
a selection unit configured to select, from the plurality of fixed stations, a fixed station that repeatedly transmits said same data a plurality of times to the single movable station in accordance with movement of the movable station,
wherein the controller controls the plurality of fixed stations in accordance with the selection by the selection unit, and
wherein the selection unit selects the fixed station that repeatedly transmits the same data a plurality of times, based on communication qualities in communications between the single movable station and each of the plurality of fixed stations in accordance with movement of the movable station.

8. The control apparatus according to claim 3,
wherein the controller is configured to allocate successive time periods to a fixed station selected by the selection unit.

9. The control apparatus according to claim 1, wherein the wireless communication is wireless communication in which a millimeter wave band is used.

10. The control method according to claim 6, wherein successive time periods are allocated to a fixed station selected in the selecting.

11. The control method according to claim 4, the wireless communication is wireless communication in which a millimeter wave band is used.

* * * * *